Feb. 15, 1944.  B. N. MacGREGOR ET AL  2,341,731
WIRE COATING APPARATUS
Filed March 7, 1942  4 Sheets-Sheet 1

INVENTORS
BASIL N. MacGREGOR
AND ROBERT O. SCOFIELD
BY
THEIR ATTORNEYS

Feb. 15, 1944.        B. N. MacGREGOR ET AL        2,341,731
WIRE COATING APPARATUS
Filed March 7, 1942        4 Sheets-Sheet 2

INVENTORS
BASIL N. MacGREGOR
AND ROBERT O. SCOFIELD
BY
THEIR ATTORNEYS

Feb. 15, 1944.    B. N. MacGREGOR ET AL    2,341,731
WIRE COATING APPARATUS
Filed March 7, 1942    4 Sheets-Sheet 3

INVENTORS
BASIL N. MacGREGOR
AND ROBERT O. SCOFIELD
BY
THEIR ATTORNEYS

Feb. 15, 1944.  B. N. MacGREGOR ET AL  2,341,731
WIRE COATING APPARATUS
Filed March 7, 1942   4 Sheets-Sheet 4
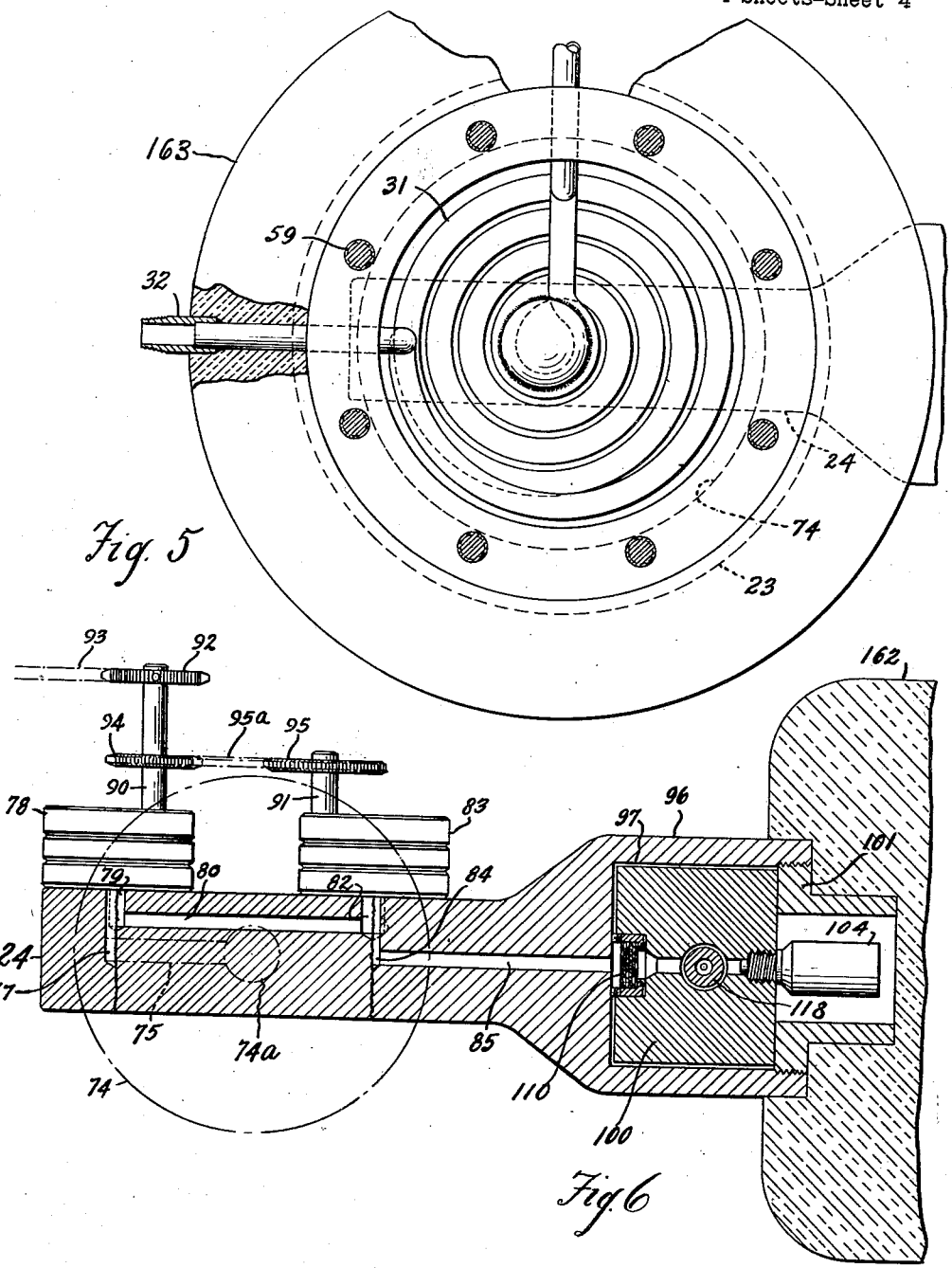
INVENTORS
BASIL N. McGREGOR
AND ROBERT O. SCOFIELD
BY
THEIR ATTORNEYS Patented Feb. 15, 1944

2,341,731

UNITED STATES PATENT OFFICE 2,341,731

WIRE COATING APPARATUS

Basil N. MacGregor and Robert O. Scofield, Warren, Ohio, assignors to General Motors Corporation, Detroit, Mich., a corporation of Delaware Application March 7, 1942, Serial No. 435,024

8 Claims. (Cl. 91—32)

This invention relates to an improved wire coating machine and particularly to a machine adapted to coat the wire by the extrusion process.

It is among the objects of the present invention to provide a wire coating machine with extrusion mechanism in which that portion of the wire at which the extruded material is applied is subjected to subatmospheric pressure while the exterior of the extruded coating material is at atmospheric pressure so that the coating, applied to the wire, will be uniform in thickness and physical characteristics.

A further object of the present invention is to provide a unitary and compact machine of simple and economical structure and design, capable of transforming a solid coating material into a plastic or molten condition and for causing said molten material to be forced under pressure into and through an extruder head having provisions for subjecting the bare wire to subatmospheric pressure at a part thereof where a coating of the molten material is extruded around it.

Further objects and advantages of the present invention will be apparent from the following description, reference being had to the accompanying drawings wherein a preferred embodiment of the present invention is clearly shown.

Figure 1:
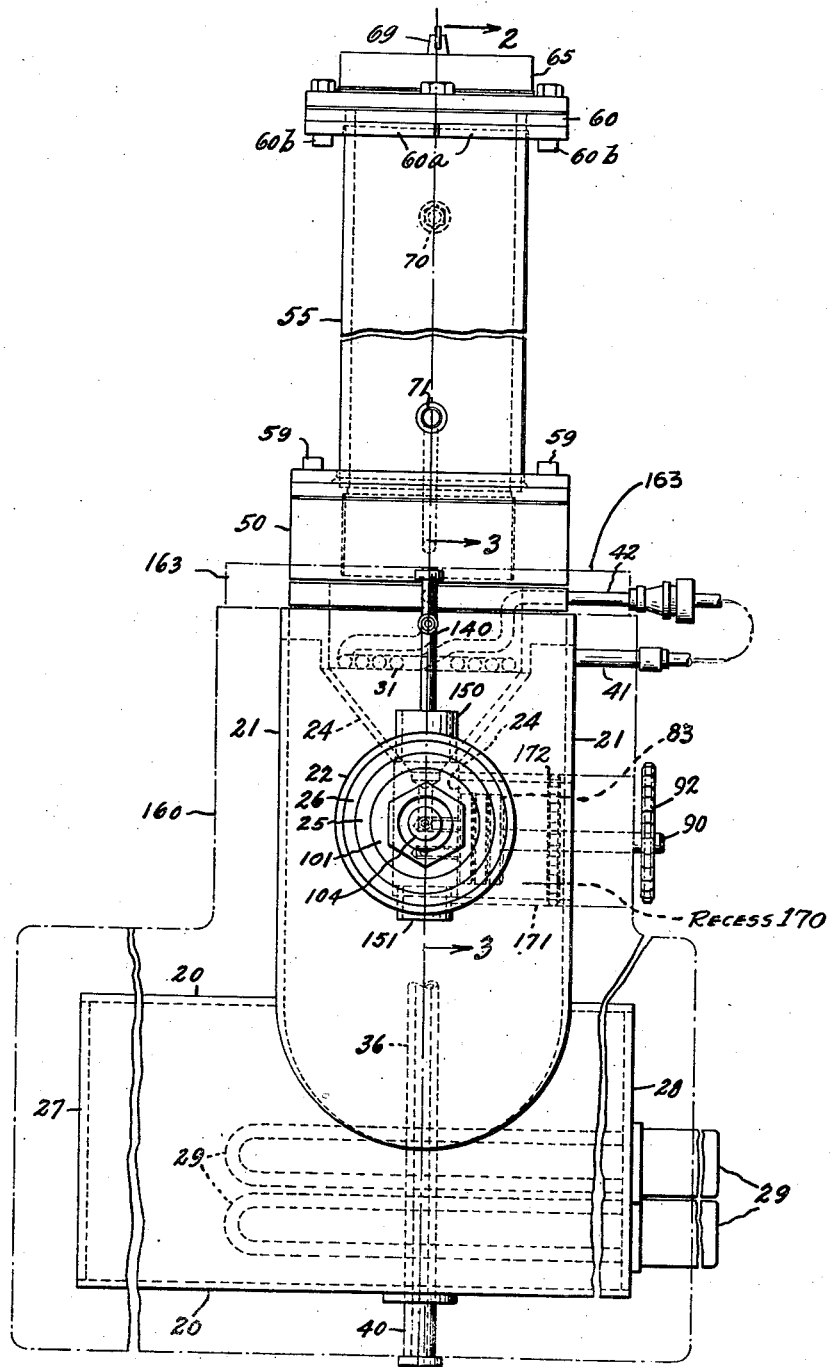
Fig. 1 is an elevation of a form of apparatus embodying the present invention, being taken in the direction of the arrow 1 in Fig. 2.
Figure 2:
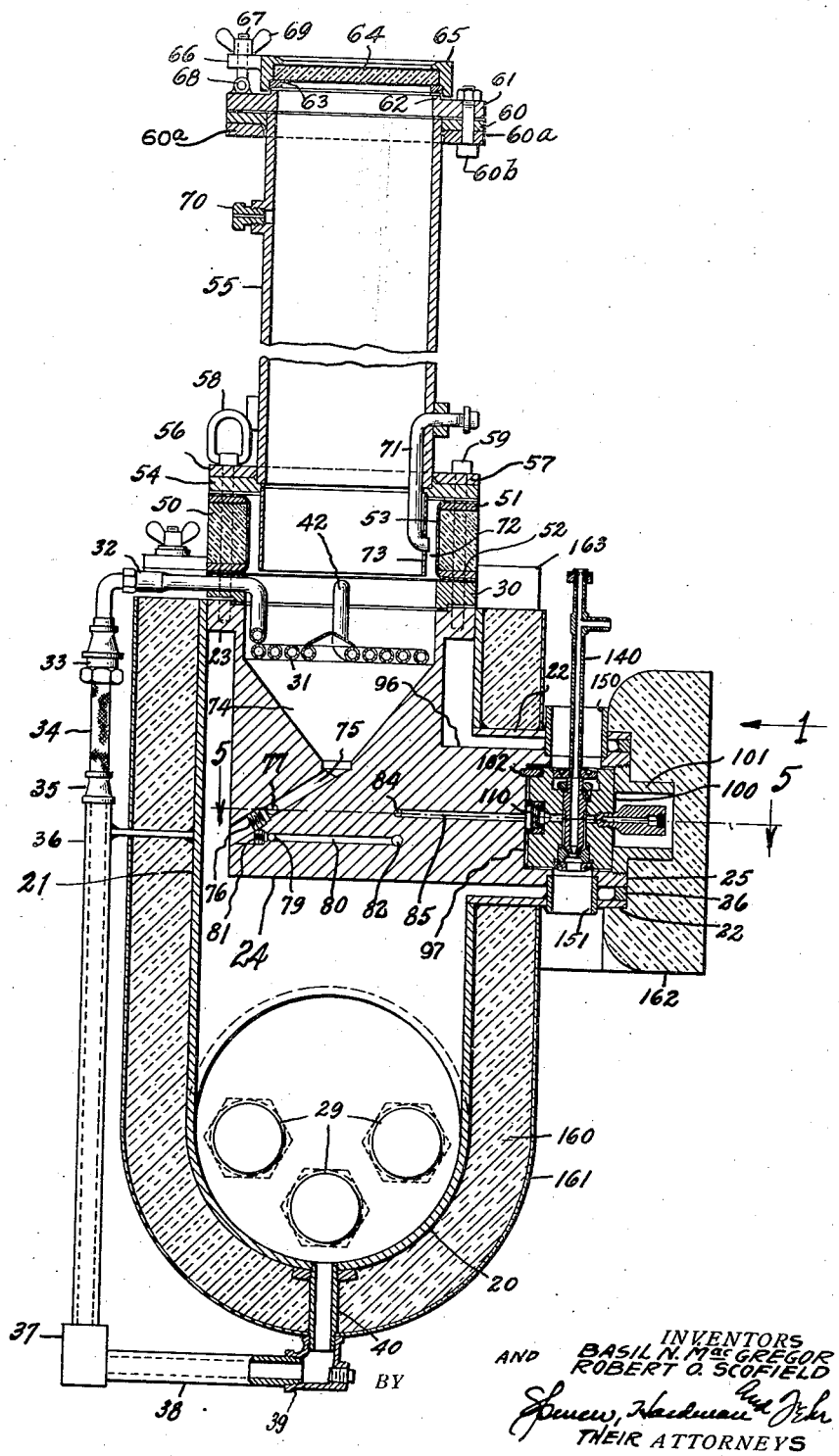
Fig. 2 is a sectional view on the line 2—2 of Fig. 1.
Figures 3, 4:
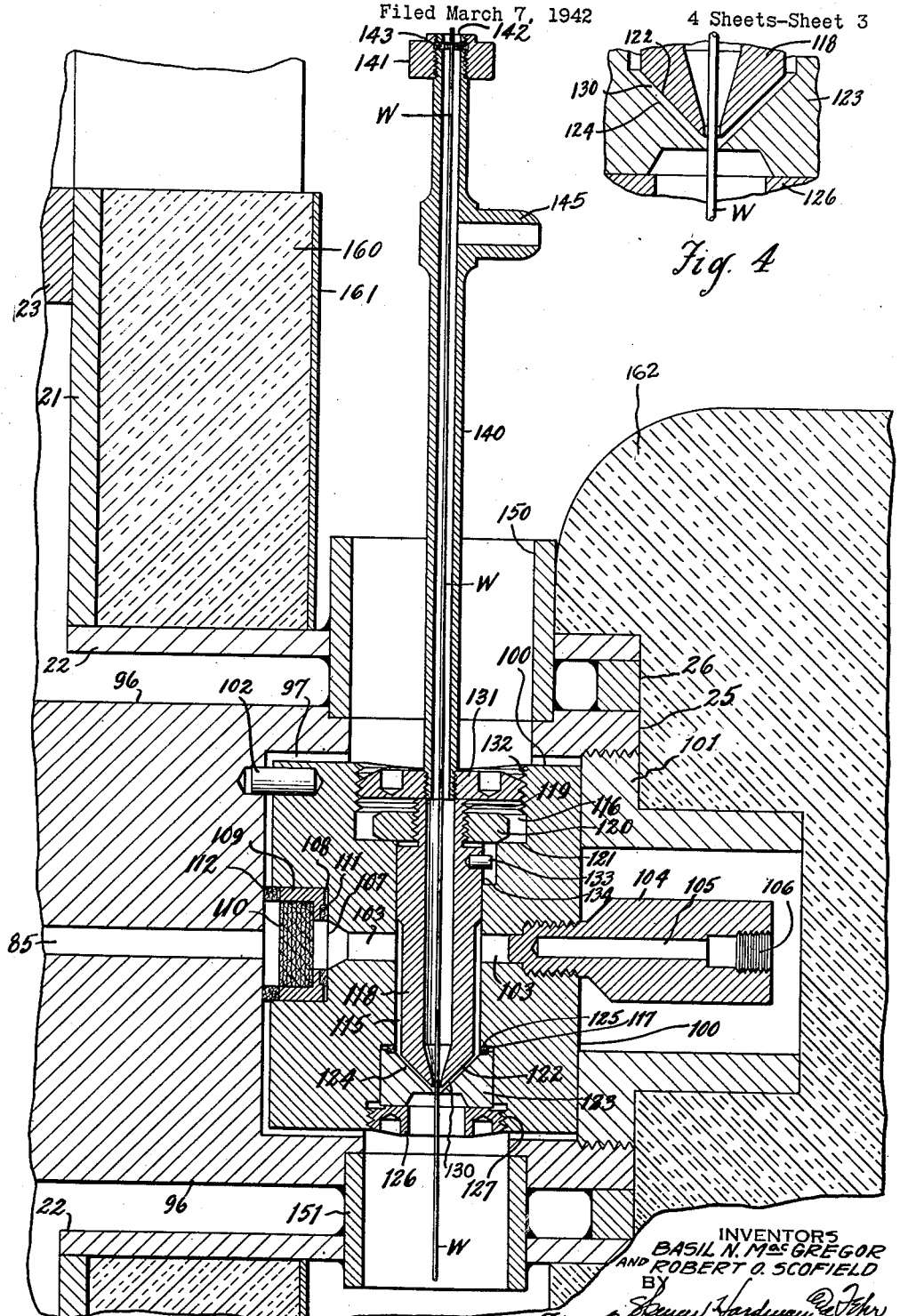

Fig. 3, which is drawn to a larger scale than Fig. 2, is a sectional view of the extruder head and neighboring parts, a section being on the line 3—3 of Fig. 1.

Fig. 4 is a fragmentary sectional view showing on an enlarged scale the wire to be coated, the wire guide tube and extruder nozzle.

Fig. 5 is a plan view of the polymer melting grid and is drawn to a larger scale than Figs. 1 and 2.

Fig. 6 which is drawn to the same scale as Fig. 5, is a sectional view substantially on the line 5—5 of Fig. 2.

The apparatus comprises a boiler which comprises a horizontal shell 20 welded to a vertical shell 21 joined to a horizontal shell 22. Shell 21 is welded at its upper end to the flange 23 of a pump and head block 24 having a side extension 25 welded to a spacing ring 26 in turn welded to the upper end of shell 22. Obviously, a portion of the upper part of shell 21 must be formed as a separate piece in order that the shell 22 and the block 24 may be placed in position, after which the pieces are permanently secured by welding. The shell 20 is provided with end walls 27 and 28 (Fig. 1), the latter of which supports a plurality of electrical heating units 29 which project within the boiler.

The block 24 which provides the closure for the upper end of shell 21 supports a metal ring 30 from which a helical coil of pipe 31 is suspended. This coil is called the "melting grid." The parts 30 and 31 as well as practically all other parts of the apparatus excepting, however, the boiler shells 20 and 21 are made of stainless steel. One end 32 of grid 31 is connected by pipe fittings, 33, 34, 35, 36, 37, 38, 39 and 40 with the lower wall of the boiler shell 20. The boiler receives an initial charge of a heat transfer medium said charge being sufficient to last for the duration of the longest run of the apparatus due to the fact that the entire system is closed, with the exception of the grid connections. Various kinds of heat transfer mediums may be used, however, applicant has found that Dowtherm A which is a eutectic mixture of the organic compounds diphenyl and diphenyl oxide, a well known product, gave very satisfactory results and therefore prefers its use over other well known and widely used heat transfer mediums. Some of this heat transfer medium is converted into vapor within the boiler to heat the block 24 and the extruder head to be described. Some of the vapor flows out through pipe 41 (Fig. 1) and into the melting grid 31 through pipe 42 where heat is given off to melt the solid polymer which descends from a hopper above, to be described. The vapor condensed in the grid 31 returns to the boiler through the pipe connections 32 to 40.

A ring 50 of good heat insulating material is formed between annular metal plates 51 and 52 and is bound together by a metal sleeve 53. The ring 50 supports an aluminum flange 54 attached to an aluminum tube 55 providing a hopper for receiving solid particles of the polymer to be melted. The flange 54 receives semi-annular clamping members 56 and 57. The parts 56, 57, 54, 50 and 30 are secured to the flange 23 of block 24 by clamping screws 58 and 59.

The hopper tube which is about 9 inches inside diameter and about 4 feet long extends upwardly from its supporting flange 54 and is provided at its upper end with an aluminum flange 60 which supports a metal ring 61 having an annular boss 62 which receives a ring 63 which secures a one-half inch glass disc 64 within a metal ring 65 provided with a plurality of notched lugs 66, each for receiving a screw 67 pivotally attached at 68 to the ring 61 and threadedly engaged by a winged nut 69 the tightening of which causes the ring 63 to be compressed between the glass and the annular boss 62 of the ring 61. Bolts 60b and half-rings 60a secure the ring 61 to the flange 60.

Since the polymer must be melted under non-oxidizing conditions, air is excluded by introducing an inert gas, such as nitrogen, through the inlet 70 at pressure slightly above atmospheric. This gas may flow out through a pipe 71, the lower end of which opens into an annular space 72 between the sleeve 53 and an aluminum baffle sleeve 73 suspended from the aluminum ring 54. The hopper lid 65 being removed, the hopper is filled with grains or particles of polymer in solid form. The lower end of the stack of polymer grains is supported by the melting grid 31 and is spaced from the heat insulating ring by the baffle sleeve 73. The polymer is melted by the heat of the melting grid 31; and the melted polymer occupies the pot 74 provided by the block 24. The pot 74 has an outlet 75 plugged at 76 and connected with passage 77 which is the inlet of a pump 78 secured to the block 24 as shown in Fig. 6. The outlet 79 of pump 78 is connected with passage 80 plugged at 81 (Fig. 2). Passage 80 is connected with inlet passage 82 of pump 83 having an outlet passage 84 connected with passage 85 to the extruder head, to be described.

As shown in Fig. 6, the shaft 90 of pump 78 has a sprocket 92 operatively connected to any drive shaft (not shown) by a chain 93. Another sprocket 94 on shaft 90 is drivingly connected to a sprocket 95 through chain 95a, sprocket 95 being secured to the shaft 91 of pump 83. Due to the fact that during the melting operation there are certain entrapped gases in the molten polymer, one pump is driven at a greater speed than the other. As a result of such differential pump operation these gases are compressed between the pumps which either forces them out or breaks them up into such minute quantities as to make them insignificant to the operation. Thus the sprockets 92, 94 and 95 are of such relative size that pump 83 operates at a slower speed than pump 78. Although the differential of pump operation is substantially constant, as for instance 7 R. P. M. the operating speeds of the pumps are varied in accordance with the size of the wire being treated, the thickness of the coating applied to the wire and the speed at which the wire traverses the machine.

In Fig. 6 the dot dash circle 74 represents the largest diameter of the pot 74 shown in Fig. 2. The smaller circle 74a represents the small diameter at the bottom leading to the outlet 75. In Fig. 6 the passages from the pot through the pumps to the extruder head can readily be traced.

The lower portion of the block 24 is provided with an enlargement 96 having a recess 97 for receiving the extruder head block 100 clamped in the position shown by a tubular nut 101 and located by a dowel pin 102 (Figs. 2 and 3). Block 100 is provided with a horizontal bore 103 closed at its right end by a plug 104 having a central bore 105 for receiving a heat measuring instrument which may be provided with a threaded exterior to fit into the screw threads at 106. The left end of bore 103 flares out at 107 into a recess 108 which receives a strainer unit comprising a shell 109 enclosing strainer material 110. A gasket ring 111 is located between the shell 109 and the block 100, and a gasket 112 is located between the shell 109 and the extension 96 of block 24.

The passage 103 through the block 100 is intercepted by a vertical bore 115 connected at its upper end with a counterbored recess 116 and at its lower end with a counterbored recess 117. The bore 115 receives a wire guide tube 118 threaded at 119 at its upper end for receiving a nut 120 which, by contacting the surface 121 of recess 116, serves as a stop for limiting the downward movement of the tube 118, thereby determining the position of the conical lower end portion 122 of the tube 118 with reference to a block 123 having an internal conically tapered surface 124. The block 123 is located in the recess 117 and a sealing gasket 125 is located between the block 123 and the block 100. Block 123 is secured in position by a nut 126 engaging the screw threads 127 provided by a wall of the recess 117. The tapered lower end 122 of guide tube 118 cooperates with the tapered internal surface 124 of block 123 to provide an annular conically tapered passage 130 through which the melted polymer is forced and is caused to envelope the wire W which passes downwardly through the guide tube 118. The width of this passage is especially critical and must be varied in accordance with the size of the wire being treated. The tube 118 is held in the desired position of adjustment by screwing against its upper end a nut 131 cooperating with the threads 132 of a wall of the recess 116. While turning the nut 120 in order to produce relative movement between the nut and the tube 118, the latter is prevented from turning by reason of a pin 133 extending therefrom into a longitudinal slot 134 in block 100.

The nut 131 supports a tube 140 threaded at its upper end to receive a nut 141 having a shoulder 142 which clamps a rubber or felt washer 143 in position. The washer is centrally apertured with a hole slightly smaller than the wire W so as to rub against the wire with sufficient pressure to provide a seal. The tube 140 is provided with a side fitting 145 to which a pipe connected with a vacuum pump may be attached. During the operation of the machine the interior of the tube 140 is subjected to subatmospheric pressure so that the bare portion of the wire W at the lower end of the tube 118 just where the extruded polymer is about to envelope the wire is subjected to subatmospheric pressure. Therefore, there is a difference in pressure between the inside surface and the outside surface of the enveloping polymer. This difference in pressure causes the polymer to be forced more uniformly around the wire, thereby securing a coating of uniform thickness.

The tube 140 is surrounded by a sleeve 150 welded to the shell 22 and to the extension 96 of block 24. After the coated wire leaves the extruder head, it passes through a sleeve 151 also welded to the shell 22 and block extension 96.

Since the block 24 is contained within the boiler, said block and the extruder head are maintained at a temperature above the melting point of the polymer. In order to reduce heat loss, the boiler is enclosed in a sheath of non-conducting material 160 enclosed in a metal jacket 161. The right-hand side of the extruder head is encased in a pad 162 of non-conducting material. In Fig. 1 the insulating enclosure 160 is represented by a dot dash line. Upon the upper end of the sheath 160 there are placed two half rings of head insulating material 163.

As shown in Fig. 1 the pumps 78 and 83 are located within a recess 170 set into the boiler and bounded by plates 171 and 172 and by the block 24. The shaft 90 which extends into this recess is driven in any convenient manner as by an electric motor, not shown.

No definite data as to the operation characteristics of the machine can be given inasmuch as these vary in accordance with the size of wire being treated and the thickness of coating being applied. However under certain circumstances this machine has been operated with a pressure of approximately 500 pounds per square inch between the pumps and a temperature of about 590° F. within the boiler and at the melting grid. The value of the subatmospheric pressure in tube 140 averages about 2 inches of mercury. The linear speed of the wire is entirely governed by the size of the wire and the thickness of the coating applied thereto. No preheating of the wire or care is necessary in this apparatus.

While the embodiment of the present invention as herein disclosed, constitutes a preferred form, it is to be understood that other forms might be adopted, all coming within the scope of the claims which follow.

What is claimed is as follows:

1. A wire coating machine comprising in combination, a supply means for a viscous material; a heating unit therefor; an extrusion nozzle having a hollow core providing a wire guide through which the wire moves to pass the mouth of the nozzle; conduits connecting the supply means and nozzle; pumps in heat transfer relation with the heating unit and in communication with said conduits for forcing the material through the nozzle onto the wire, said heating unit also heating the nozzle and the coating material passing therethrough.

2. A wire coating machine comprising in combination, a supply hopper containing a coating material; a grid through which the material passes; a heating unit connected to said grid to render the coating material viscous; an extrusion nozzle, heated by the heating unit, and having a hollow core providing a wire guide; means in heat transfer relation with said heating unit, for forcing the viscous coating material through the extrusion nozzle onto the wire passing through the core a pot for receiving the viscous material; and conduits connecting the pot with said forcing means and said means with the nozzle.

3. A wire coating machine comprising in combination, a supply hopper containing a coating material; a grid through which the material passes; a heating unit for said grid to render the coating material viscous; a pot into which said viscous material passes; an extrusion nozzle, heated by the heating unit, and having a hollow core providing a wire guide; means in heat transfer relation with said heating unit, for forcing the viscous coating material through the extrusion nozzle onto the wire passing through the core; conduits providing communication between the pot and forcing means and said forcing means and nozzle; and means for providing a subatmospheric pressure around the wire within the confines of the nozzle core forming the wire guide.

4. A wire coating machine comprising in combination, a supply means for a viscous coating material; an extrusion nozzle providing a wire guide through which the wire is moved to pass coaxially through the mouth of the nozzle; means for forcing the material through the nozzle onto the passing wire; conduits connecting the supply means with the forcing means and the forcing means with the nozzle; and means providing a differential pressure on each side of the opening of the wire guide through which the wire passes and enters the mouth of the nozzle whereby the viscous material is urged into intimate contact with the surface of the wire and be of uniform thickness.

5. A wire coating machine comprising in combination; a supply means for a viscous coating material; an extrusion nozzle providing a wire guide through which the wire is moved to pass coaxially through the mouth of the nozzle; means for forcing the material through the nozzle onto the passing wire; pipes connecting the supply means, the forcing means and the extrusion nozzle; and means providing a subatmospheric pressure within the wire guide and at the point in the nozzle when the coating material is applied to the wire whereby the inner surface of the extruded material is subjected to subatmospheric pressure while the exterior surface thereof is subjected to atmospheric pressure causing the material to be urged into intimate contact with said passing wire.

6. A wire coating machine comprising in combination, a supply means for a viscous coating material; an extrusion nozzle comprising a block having a passage with a restricted opening and a hollow core in said passage, one end of the core cooperating with the restricted opening of the passage to provide an extrusion orifice, the hollow core providing a wire guide for passing the wire concentrically through the extrusion orifice; a pump for forcing the viscous material through the nozzle onto the passing wire; conduits connecting the supply means with the pump and the pump with the nozzle; and means providing a differential pressure on each side of the opening in the wire guide through which the wire passes to the nozzle orifice whereby the viscous material is pressed circumferentially into intimate contact with the surface of the wire and be of uniform thickness.

7. A wire coating machine comprising in combination, a supply means for a viscous coating material; an extrusion nozzle comprising a block having a passage with a restricted opening and a hollow core in said passage, one end of the core cooperating with the restricted opening of the passage to provide an extrusion orifice, the hollow core providing a wire guide for passing the wire concentrically through the extrusion orifice; a conduit connecting the supply means with the nozzle; a pump connected to said conduit for forcing the viscous material through the conduit into the nozzle and onto the passing wire; and means providing a subatmospheric pressure within the wire conducting guide which tends to draw the material, forced under pressure into the extrusion nozzle, toward the interior of said guide through which the wire is constantly passing in the opposite direction, whereby said viscous material is air pressed into intimate contact with said wire.

8. A wire coating machine comprising in combination, a boiler; heating means within the boiler; a medium in said boiler which, when heated, is transformed into hot vapor; a head block in said boiler, heated by the vapors therein, and provided with a receiving chamber; a hopper in communication with said receiving chamber, said hopper containing the supply of wire coating material; a grille between the hopper and receiving chamber and connected by pipes with the boiler, said grille being heated by the vapors from the boiler so as to transform the coating material into a viscous mass adapted to enter the receiving chamber; an extrusion nozzle having a central passage providing a wire guide through which the wire is moved through and past the mouth of the extrusion nozzle; conduits in the head block connecting the extrusion nozzle with the receiving chamber; force feed mechanism on the head block so as to be heated thereby and connected to said conduits for forcing the viscous covering material through the conduits and the nozzle onto the wire passing therethrough; and means providing a pressure in the wire guide, lower than the pressure outside said guide whereby said differential pressures will urge the covering material into intimate contact with the wire as it moves from the guide through the mouth of the nozzle.

BASIL N. MacGREGOR.
ROBERT O. SCOFIELD.